(12) United States Patent
Aoyama et al.

(10) Patent No.: US 7,839,110 B2
(45) Date of Patent: Nov. 23, 2010

(54) MOTOR CONTROL SYSTEM

(75) Inventors: Kazunari Aoyama, Yamanashi (JP);
Kunitaka Komaki, Yamanashi (JP);
Yasuharu Aizawa, Yamanashi (JP)

(73) Assignee: Fanuc Ltd, Yamanashi (JP)

(*) Notice: Subject to any disclaimer, the term of this patent is extended or adjusted under 35 U.S.C. 154(b) by 366 days.

(21) Appl. No.: 12/041,853

(22) Filed: Mar. 4, 2008

(65) Prior Publication Data
US 2008/0238351 A1 Oct. 2, 2008

(30) Foreign Application Priority Data
Mar. 27, 2007 (JP) .............................. 2007-081371

(51) Int. Cl.
*G05B 19/18* (2006.01)
(52) U.S. Cl. ....................... 318/569; 318/599; 318/600; 318/677
(58) Field of Classification Search ................. 318/569, 318/599, 600, 677
See application file for complete search history.

(56) References Cited

U.S. PATENT DOCUMENTS

| | | | |
|---|---|---|---|
| 5,252,902 A | 10/1993 | Uehara et al. | |
| 5,940,292 A | 8/1999 | Kurakake et al. | |
| 6,147,469 A | 11/2000 | Uchida et al. | |
| 6,442,444 B2 | 8/2002 | Matsubara et al. | |
| 6,566,836 B2 | 5/2003 | Matsubara et al. | |
| 6,791,294 B1 * | 9/2004 | Kazama et al. ............. | 318/677 |
| 7,026,778 B2 | 4/2006 | Aoyama et al. | |
| 7,038,418 B2 * | 5/2006 | Noda et al. .................. | 318/569 |
| 7,180,261 B1 * | 2/2007 | Tsai ............................ | 318/625 |
| 7,274,968 B1 * | 9/2007 | Toyonaga ................... | 700/169 |

FOREIGN PATENT DOCUMENTS

| | | |
|---|---|---|
| JP | 03-245204 A | 10/1991 |
| JP | 03-119204 U | 12/1991 |
| JP | 969004 A | 3/1997 |
| JP | 10124131 A | 5/1998 |
| JP | 2002120128 A | 4/2002 |
| JP | 2004086716 A | 3/2004 |
| JP | 2004280506 A | 10/2004 |
| WO | 0135522 A1 | 5/2001 |

OTHER PUBLICATIONS

Extended EP Search Report for EP08003976.1 dated Apr. 25, 2008.

\* cited by examiner

*Primary Examiner*—Walter Benson
*Assistant Examiner*—David S Luo
(74) *Attorney, Agent, or Firm*—Lowe Hauptman Ham & Berner LLP

(57) ABSTRACT

A motor control system includes a first-type amplifier that receives a PWM instruction, a second-type amplifier that receives a positional instruction, a numerical control device, and a serial bus. The numerical control device includes a first processor that calculates a positional instruction of a motor, a DSP that calculates a PWM instruction of the first-type amplifier from the positional instruction, and a serial bus control circuit that outputs the PWM instruction of the first-type amplifier and the positional instruction of the second-type amplifier to the serial bus. The first-type amplifier generates a drive current signal of a motor directly from the received PWM instruction. The second-type amplifier includes a third processor that calculates a PWM instruction from the received positional instruction.

5 Claims, 11 Drawing Sheets

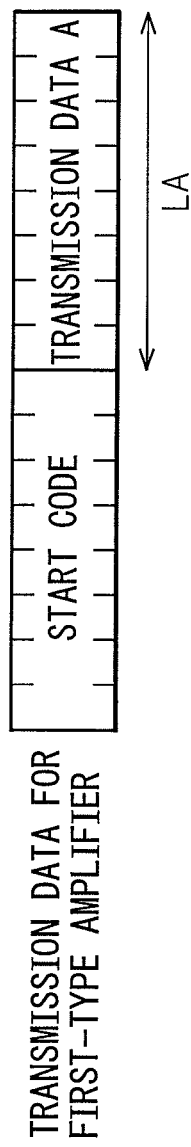
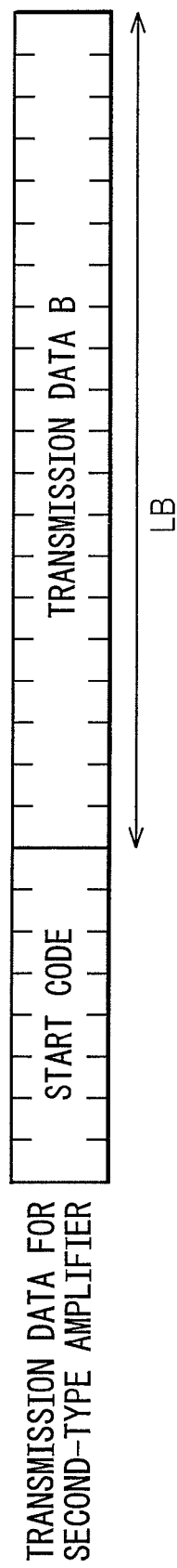

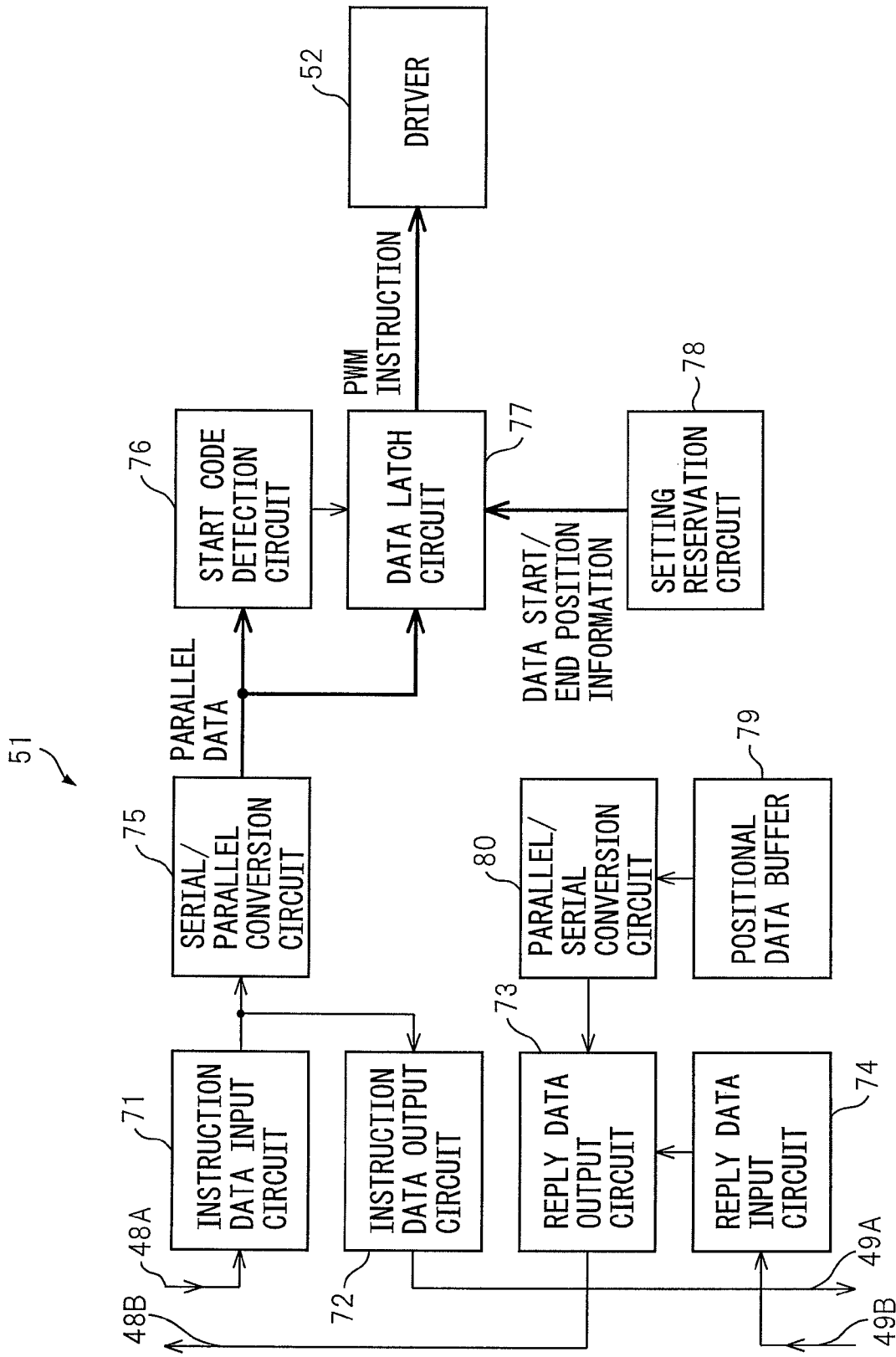

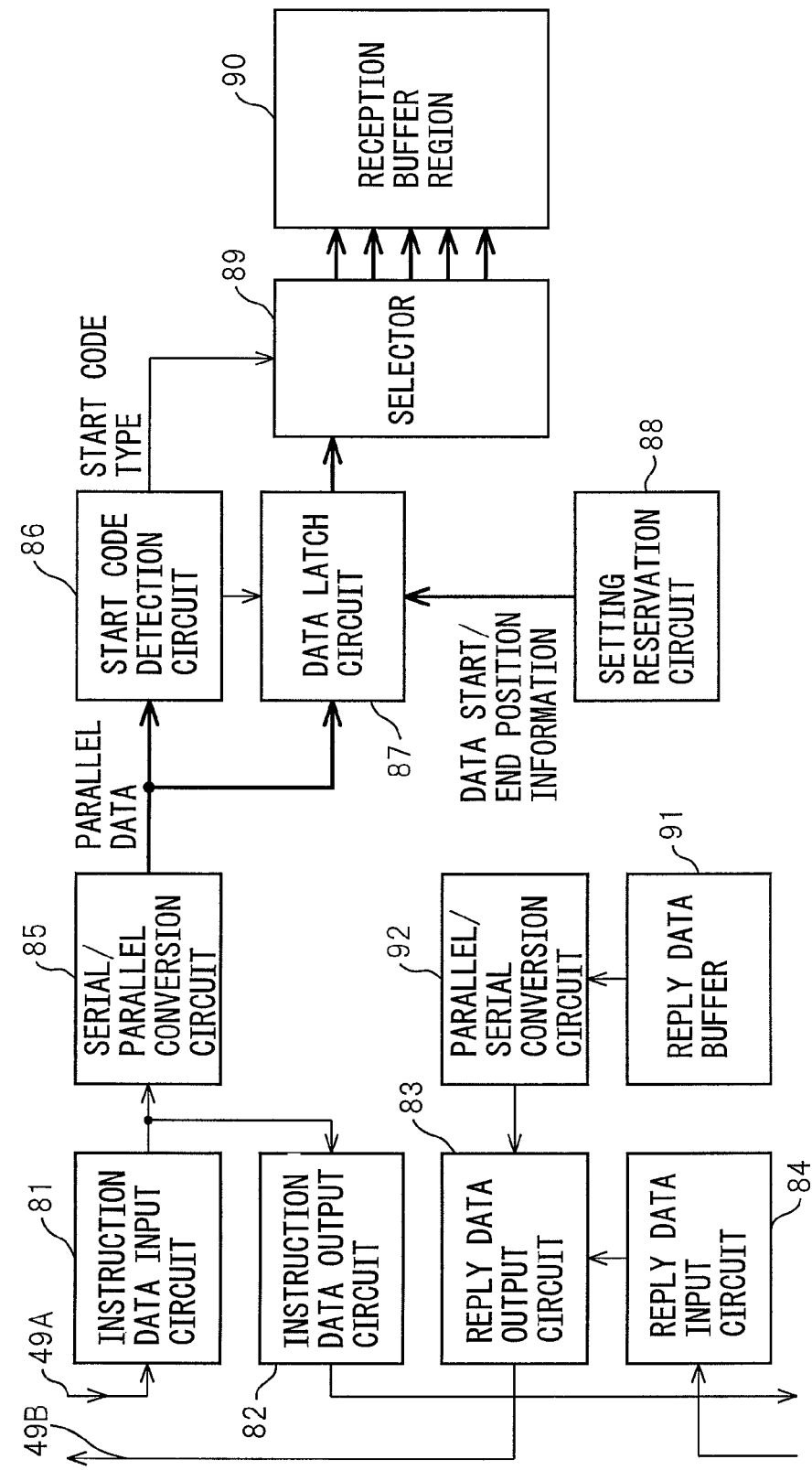

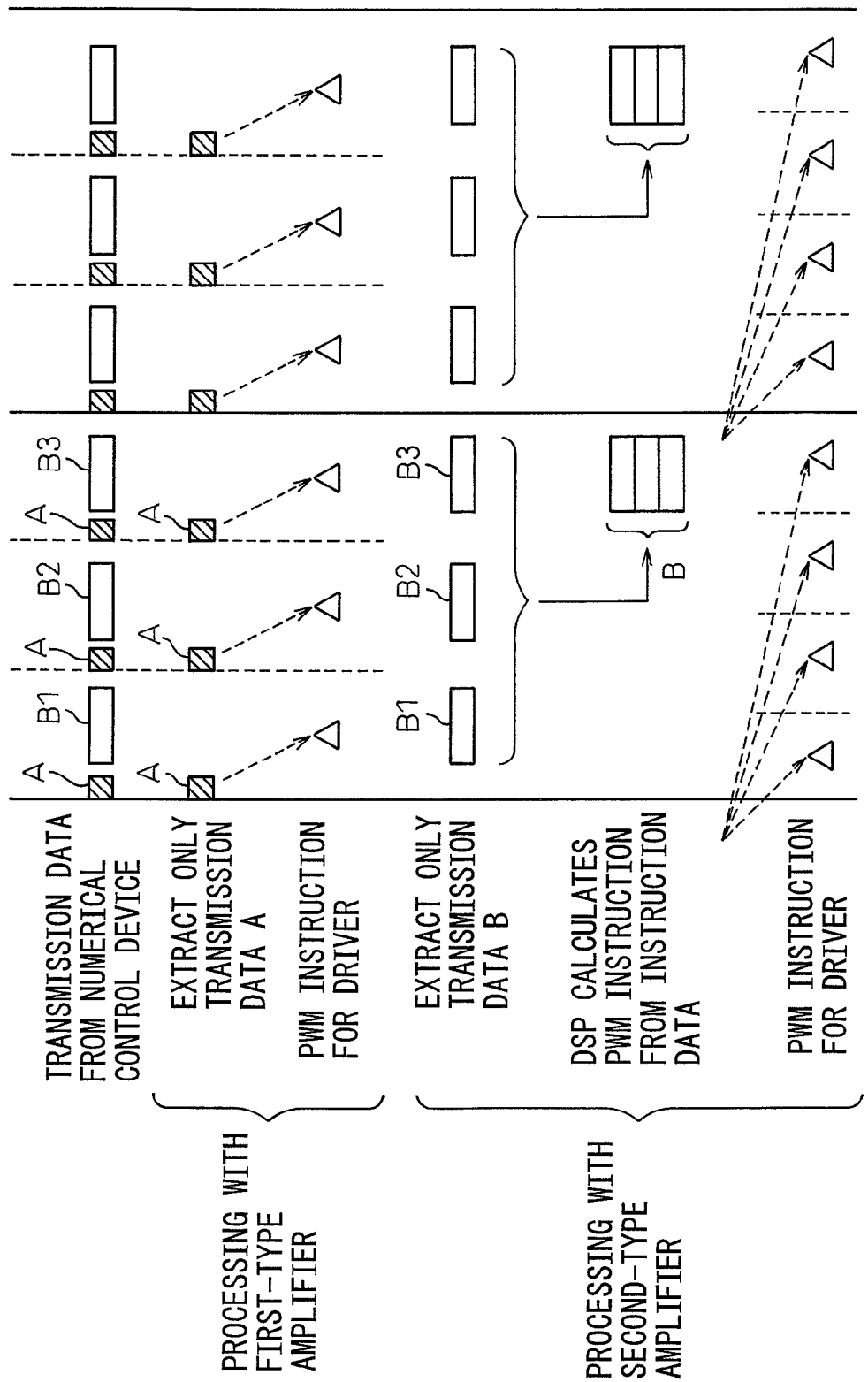

FIG.11
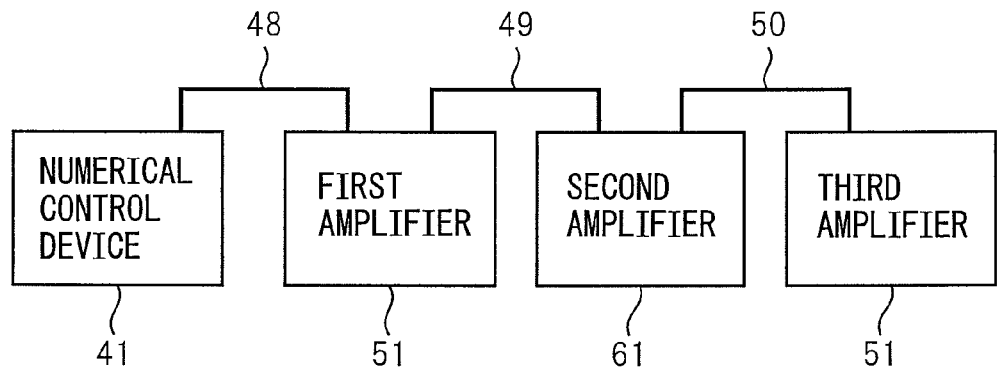
FIG.12
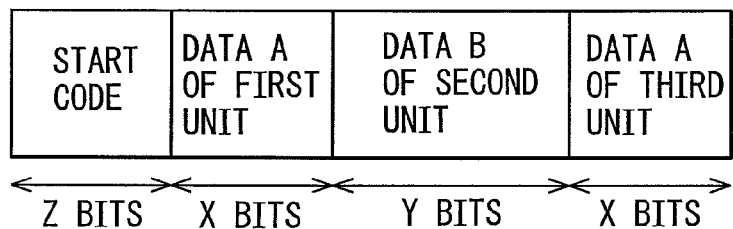
FIG.13
|  | DATA TYPE | DATA BIT OF START POSITION (BIT) | DATA BIT OF END POSITION (BIT) |
|---|---|---|---|
| START CODE |  | 1 | Z |
| FIRST UNIT | A | Z+1 | Z+X |
| SECOND UNIT | B | Z+X+1 | Z+X+Y |
| THIRD UNIT | A | Z+X+Y+1 | Z+X+Y+X |
| FOURTH UNIT | NONE | NONE | NONE |

MOTOR CONTROL SYSTEM

CROSS-REFERENCE TO RELATED APPLICATION

This application is based upon and claims priority from prior Japanese Patent Application No. 2007-081371, filed on Mar. 27, 2007, the entire contents of which are incorporated herein by reference.

BACKGROUND OF THE INVENTION

The present invention relates to a motor control system that controls a motor by a numerical control device, and more specifically, to a motor control system that controls a plurality of motors by one numerical control device (hereinafter, also referred to as CNC device).

FIG. 1 is a block diagram showing a configuration of motor control by a conventional numerical control device. As shown in FIG. 1, a numerical control device 11 has a main processor 12, a DSP (Digital Signal Processor) 13, and a driver 14. Main processor 12 calculates a positional instruction or velocity instruction for specifying the (rotation) position of a motor 15 to be controlled and outputs it to DSP 13. DSP 13 calculates a current value necessary to drive motor 15 from the given positional instruction or velocity instruction and the positional information of the motor to be transmitted from a pulse coder 16 attached to motor 15 and outputs it to driver 14 as a PWM (Pulse Width Modulation) signal. Driver 14 generates and outputs a current signal to actually drive motor 15 based on the transmitted PWM signal and at the same time, measures a current that has flown through the motor and returns it to DSP 13. DSP 13 controls the PWM signal so that the current valve will be exactly the same as that calculated. In addition, when new positional information is sent from pulse coder 16, DSP 13 calculates and outputs a new current value and PWM signal and continues outputting the current until the motor rotates to the position specified by the positional instruction.

It is possible to integrate the hardware of numerical control device comprising main processor 12, DSP 13, and driver 14 into a single unit. However, when there are two or more motors to be controlled, or when there are two or more types of motor to be controlled, it is necessary to prepare units in a number corresponding to the number of combinations. Generally, in a numerical control device for a working machine, parts relating to the drive of the motor are separated from the numerical control device. In other words, the numerical control device in a narrow meaning that mounts a main processor is separated from a plurality of amplifiers in a number corresponding to the number and kinds of motors, and the numerical control device and the amplifiers are coupled via serial communication. The configuration of these are described in, for example, Japanese Unexamined Patent Publication (Kokai) No. H9-69004 and Japanese Unexamined Paten Publication (Kokai) No. 2002-120128 (U.S. Pat. No. 5,940,292A1 and U.S. Pat. No. 6,566,836B2).

When the amplifiers are separated, it is determined whether the mounting position of DSP is on the side of the numerical control device or the side of the amplifier by considering both advantages and disadvantages relating to the individual costs, functions, and specifications. There may be a case where one single numerical control device is used in both of the configurations. Refer to Japanese Unexamined Patent Publication (Kokai) No. H9-69004 and Japanese Unexamined Patent Publication (Kokai) No. 2002-120128.

For example, there is an advantage of providing a DSP on the side of the control device that a large amount of data to be used in an adjustment tool etc., of a motor can be processed by a main processor even in a multi spindle system in which the main processor and the plurality of DSPs are connected via a high-speed bus on the numerical control device so as to transmit a large amount of data in a predetermined period of time.

On the other hand, for example, there is an advantage of providing a DSP on the side of the amplifier that it is made possible to stop the motor while controlling it even if it is made impossible to control the motor due to trouble in the numerical control device because the DSP is on the side of the amplifier.

FIG. 2 is a block diagram showing a configuration in which an amplifier without a DSP and an amplifier with a DSP are controlled by a single numerical control device. An amplifier 28 that controls a motor 30 has only a driver 29 and no DSP is provided. An amplifier 32 that controls a motor 35 has a DSP 33 and a driver 34. A numerical control device 20 has a main processor 21, a DSP 22, a transmission buffer 23, a serial bus control circuit 24, a transmission buffer 25, and a serial bus control circuit 26. Serial bus control circuit 24 and amplifier 28 are connected via a serial bus 27 and serial bus control circuit 26 and amplifier 32 are connected via a serial bus 31. The positional information detected by the pulse coder of motor 30 is transmitted to DSP 22, the positional information detected by the pulse coder of motor 35 is transmitted to DSP 33 of amplifier 32, and DSP 33 transmits the positional information as is or after processing it to main processor 21. However, as a result, numerical control device 20 has an interface (IF) circuit for receiving the positional information, which is not shown schematically here.

Main processor 21 calculates the positional instruction of two motors 30, 35, outputs the positional instruction of motor 30 to DSP 22, and outputs the positional instruction of motor 35 to transmission buffer 25. DSP 22 calculates a current value necessary to drive motor 30 from the given positional instruction and the positional information of motor 30 and outputs it to transmission buffer 23 as a PWM (Pulse Width Modulation) signal. Serial bus control circuit 24 outputs the PWM signal retained in transmission buffer 23 to serial bus 27. Driver 29 within amplifier 28 generates and outputs a current signal of motor 30 based on the transmitted PWM signal. Although not shown schematically, when it is necessary to return the current value of the current that has flown through the motor detected by driver 29 to DSP 13, another communication path is provided separately. However, there may be a case where the positional information detected by the pulse coder is once collected by amplifier 28 and it is transmitted together with the current value to DSP 22. Serial bus control circuit 26 outputs the positional instruction retained in the transmission buffer 25 to serial bus 31. DSP 33 in amplifier 32 calculates a current value necessary to drive motor 35 from the received positional instruction and the positional information of motor 35 and outputs it to driver 34 as a PWM (Pulse Width Modulation) signal. Driver 34 generates and outputs a current signal of motor 35 based on the PWM signal.

Hereinafter, an amplifier that does not have a DSP, receives a PWM signal, and generates a current output to a motor is referred to as a first-type amplifier and an amplifier that has a DSP, receives a positional instruction, and generates a current output to a motor is referred to as a second-type amplifier.

Generally, the amount of data of a PWM signal to be transmitted to a first-type amplifier at one time is smaller than the amount of data of a positional instruction to be transmitted to a second-type amplifier at one time. However, it is necessary to increase the frequency with which the instruction data (PWM signal) is transmitted to the first-type amplifier greater than the frequency with which the instruction data (positional instruction) is transmitted to the second-type amplifier.

SUMMARY OF THE INVENTION

As shown in FIG. 2, when one numerical control device controls a first-type amplifier without a DSP and a second-type amplifier with a DSP, it is necessary to prepare a serial bus that connects with the first-type amplifier and a serial bus that connects with the second-type amplifier, respectively, in the numerical control device, and therefore, the number of serial bus control circuits (IF circuits) provided in the numerical control device and the number of connectors accompanying them increase and there is a problem in that the numerical control device increases in size accordingly and the cost is raised.

WO01-035522 describes a servo control system in which one numerical control device controls a positioning-type servo amplifier and an instruction-following type servo amplifier via a common serial IF. However, in the servo control system described in WO01-035522, settings must be made to use any one of the amplifiers by rewriting control information of each amplifier, and the configuration that each amplifier has a DSP is described, but the connection of a first-type amplifier without a DSP is not described.

An object of the present invention is to simplify the configuration of a motor control system in which one numerical control device controls a first-type amplifier without a DSP and a second-type amplifier with a DSP.

In order to achieve the above object, the motor control system according to the present invention is characterized in that the system comprising: at least one first-type amplifier that generates a drive current signal of a motor based on a PWM instruction; at least one second-type amplifier that generates a drive current signal of a motor based on a positional instruction or a velocity instruction; a numerical control device that controls the at least one first-type amplifier and the at least one second-type amplifier; and a serial bus that sequentially connects the numerical control device, the at least one first-type amplifier, and the at least one second-type amplifier, wherein the numerical control device comprises: a first processor (main processor) that calculates a positional instruction or a velocity instruction of all of the motors to be controlled; a second processor (DSP) that calculates a PWM instruction from the positional instruction or velocity instruction of the motor to be driven by the at least one first-type amplifier calculated by the first processor; and a serial bus control circuit that outputs the PWM instruction calculated by the second processor and the positional instruction or velocity instruction of the motor to be driven by the at least one second-type amplifier calculated by the first processor, the first-type amplifier generates a drive current signal of a motor directly from the PWM instruction received from the numerical control device via the serial bus, and the second-type amplifier comprises a third processor (DSP) that calculates a PWM instruction of a motor from the positional instruction or the velocity instruction received from the numerical control device via the serial bus and generates a drive current signal of a motor from the PWM instruction calculated by the third processor.

The system is configured such that the numerical control device divides and transmits the positional instruction or the velocity instruction to the second-type amplifier, but dose not divide the PWM instruction to the first-type amplifier and transmits a plurality of the PWM instructions while transmitting the positional instruction or the velocity instruction of one of the second-type amplifiers, and the second-type amplifier comprises a buffer that integrates the divided positional instructions or velocity instructions received into one instruction.

As described above, the amount of data of the PWM signal to be transmitted at one time to the first-type amplifier is smaller than the amount of data of the positional instruction to be transmitted at one time to the second-type amplifier. However, it is necessary to increase the frequency with which the data (PWM signal) is transmitted to the first-type amplifier than the frequency with which the data (positional instruction) is transmitted to the second-type amplifier. The frequency of data transmission, i.e., the communication period, is determined by the motor to be controlled. However, if the time required to transmit the positional instruction to the second-type amplifier is longer than the transmission period of the first-type amplifier, a state is brought about in which it is not possible to transmit the PWM signal correctly to the first-type amplifier. In order to avoid such a state, the transmission of the PWM signal to the first-type amplifier is carried out with the required transmission period and the positional instruction or the velocity instruction of the second-type amplifier is divided and transmitted.

The numerical control device comprises: a first transmission buffer that stores the PWM instruction calculated by the second processor; and a second transmission buffer that stores the positional instruction or the velocity instruction calculated by the first processor, and the serial bus control circuit outputs the instruction stored in the first transmission buffer or the second transmission buffer to the serial bus according to the amplifier connected to the serial bus.

The first-type and second-type amplifiers comprise: an input circuit that inputs transmission data from the serial bus; and an output circuit that outputs the transmission data input to the input circuit to an amplifier in the next stage.

It is desirable to use the common serial bus also for the transmission of the positional information (reply data) etc., of the motor to be driven by each amplifier to the numerical control device. The motor control system according to the present invention is configured so as to comprise: a second serial bus that sequentially connects at least one first-type amplifier; at least one second-type amplifier; and a numerical control device, wherein the first-type and second-type amplifiers comprise: a second input circuit that inputs transmission data from the second serial bus; and a second output circuit that outputs the transmission data input to the input circuit to the second serial bus directed toward the next stage amplifier or the numerical control device, and wherein the first-type and second-type amplifiers add the positional information data of the motor to be controlled by the amplifier to the positional information data received from the previous stage amplifier of the second serial bus and output it from the second output circuit to the second serial bus.

According to the present invention, because the first-type amplifier without a DSP and the second-type amplifier with a DSP (the third processor) can be controlled through the common serial bus control circuit of the numerical control device, the cost can be reduced by reducing the number of interface circuits (serial bus control circuits) to be provided in the numerical control device.

BRIEF DESCRIPTION OF THE DRAWINGS

The features and advantages of the invention will be more clearly understood from the following description taken in conjunction with accompanying drawings, in which:

FIGS. 4A and 4B are diagrams showing a configuration of instruction data to a conventional amplifier;

FIG. 7 is a diagram showing a configuration of a first-type amplifier that receives a PWM instruction in the first embodiment;

FIG. 8 is a diagram showing a configuration of a second-type amplifier that receives a positional instruction in the first embodiment;

FIG. 10 is a time chart showing the operation of each part in the first embodiment;

FIG. 11 is a diagram showing a configuration of a motor control system in a second embodiment of the present invention;

FIG. 12 is a diagram showing a configuration of instruction data in the second embodiment; and FIG. 13 is a diagram showing an example of the setting of control data of a serial bus control circuit of a numerical control device in the second embodiment.

DETAILED DESCRIPTION

In the following, the preferred embodiments are described. However, these embodiments are described only for explaining the invention, and the invention is not limited to the described embodiments.

Figure 3:
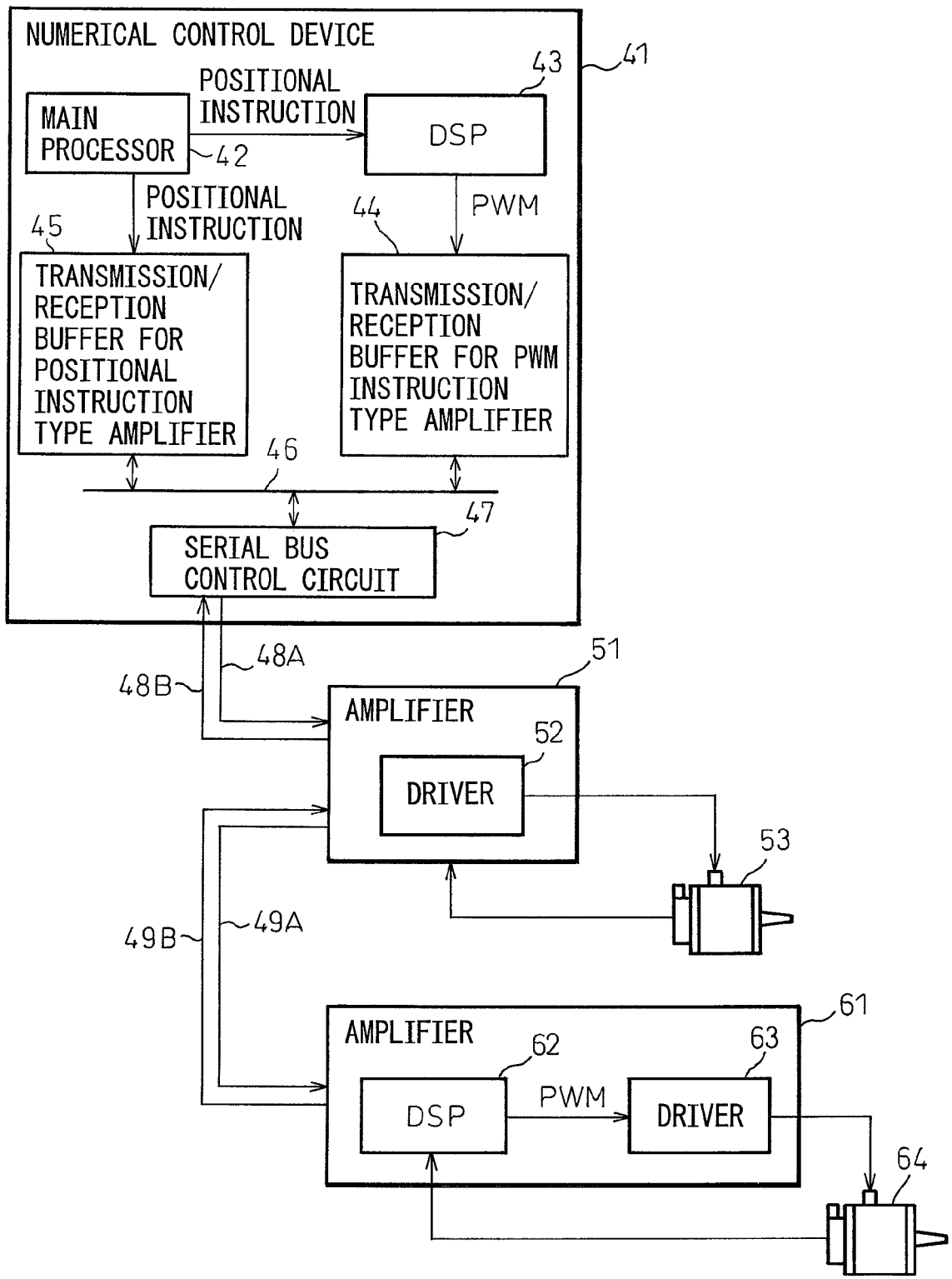
FIG. 3 is a diagram showing a configuration of a motor control system in a first embodiment of the present invention.

FIG. 3 is a block diagram showing a configuration of a motor control system in a first embodiment of the present invention. As shown schematically, the motor control system in the first embodiment has a numerical control device 41, an amplifier 51 that supplies a current output to drive a motor 53, an amplifier 61 that supplies a current output to drive a motor 64, serial buses 48A and 48B that connect numerical value control device 41 and amplifier 51, and serial buses 49A and 49B that connect amplifier 61 and amplifier 51.

Amplifier 51 is a first-type amplifier that does not have a DSP and in which a driver 52 directly generates a current output from a PWM signal transmitted via serial bus 48A. Amplifier 61 is a second-type amplifier that has a DSP 62 and in which DSP 62 calculates a PWM signal from a positional instruction or velocity instruction (hereinafter, referred to only as a positional instruction) transmitted through serial bus 49A and a driver 63 generates a current output from the PWM signal.

Amplifier 61 outputs the positional information (reply data) transmitted from the pulse coder of motor 64 to serial bus 49B as is or after processing it in DSP 62. Amplifier 51 outputs the positional information of amplifier 61 received from serial bus 49B to serial bus 48B and at the same time, outputs the positional information transmitted from the pulse coder of motor 53 to serial bus 48B. Numerical control device 41 receives the positional information of amplifier 61 and the positional information of amplifier 51 from serial bus 48B to use them to generate a positional instruction.

Numerical control device 41 has a main processor 42, a DSP 43, a transmission/reception buffer 44 for a PWM instruction type amplifier, a transmission/reception buffer 45 for a positional instruction type amplifier, an internal bus 46, and a serial bus control circuit 47. Main processor 42 calculates a positional instruction for instructing the (rotation) position of motors 53 and 64 to be controlled, outputs the positional instruction of motor 53 to DSP 43, and stores the positional instruction of motor 64 in transmission/reception buffer 45 for a positional instruction type amplifier. DSP 43 calculates a current value necessary to drive motor 53 from the given positional instruction and the positional information of motor 53, to be described later, and stores as a PWM (Pulse Width Modulation) signal in transmission/reception buffer 44 for a PWM instruction type amplifier.

Serial bus control circuit 47 alternately outputs the instruction data to amplifier 51 read from transmission/reception buffer 44 for a PWM instruction type amplifier and the instruction data to amplifier 61 read from transmission/reception buffer 45 for a positional instruction type amplifier to serial bus 48A with a predetermined cycle. Here, data transmission in the conventional example is explained before data transmission in the first embodiment is explained.

Figure 1:
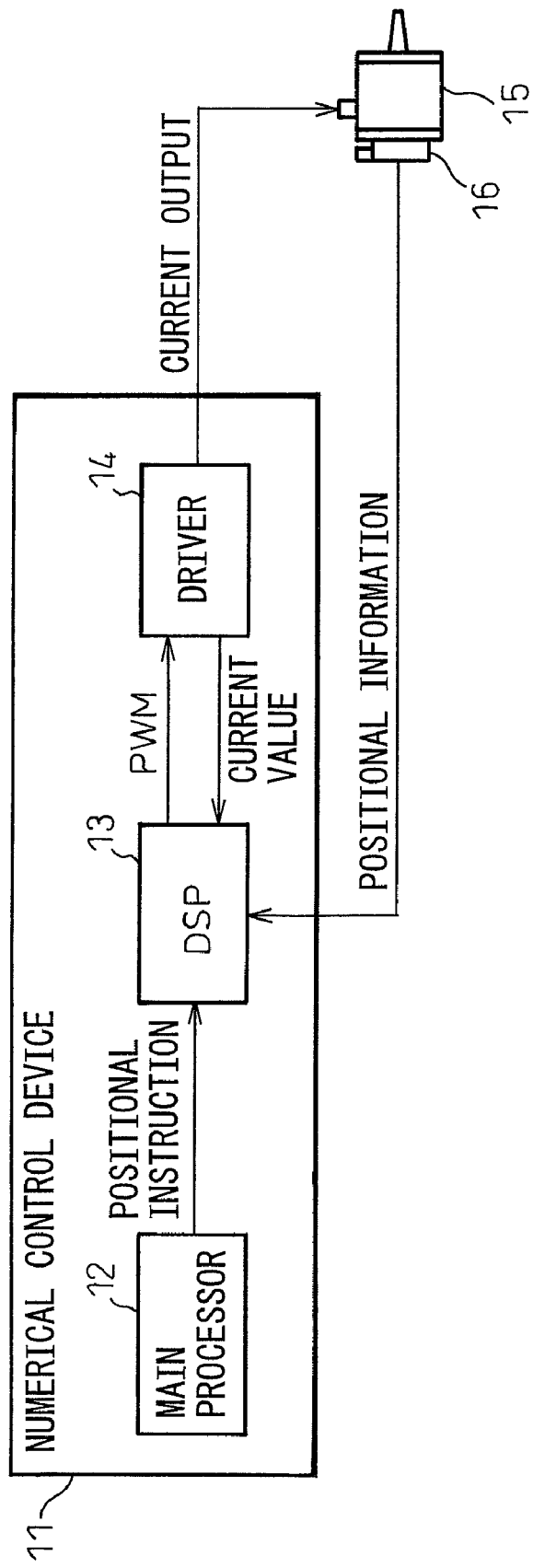
FIG. 1 is a diagram showing a configuration example of a conventional motor control system.
Figure 2:
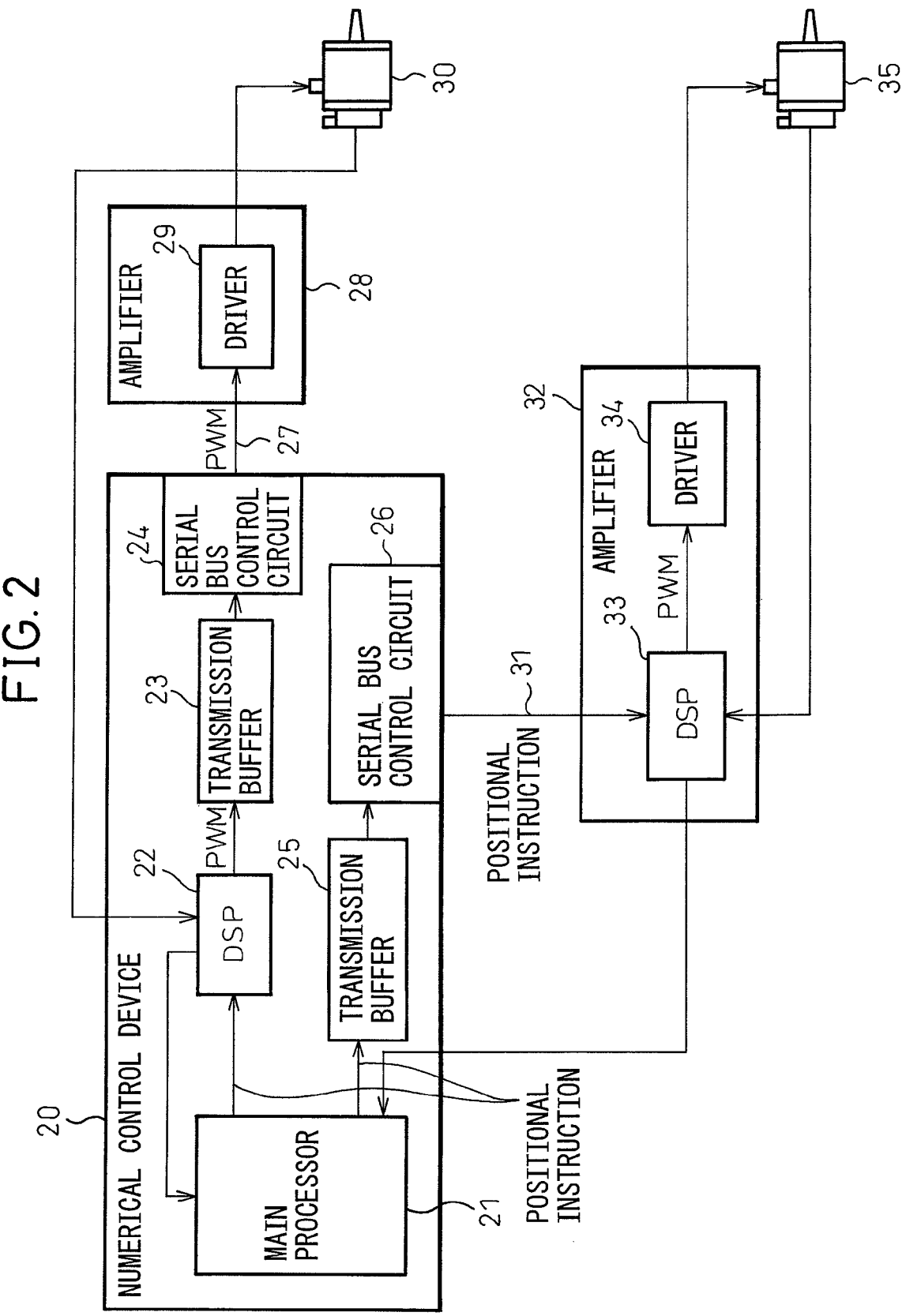
FIG. 2 is a diagram showing a configuration of a conventional motor control system in which amplifiers of different types are connected to one numerical control device.

FIG. 4A and FIG. 4B are diagrams showing a configuration of instruction data to first-type amplifier 28 and second-type amplifier 35 in the conventional motor control system shown in FIG. 2. As shown schematically, the instruction data to be provided to the amplifiers of both types has start code at the beginning portion and the instruction data to the first-type amplifier has transmission data A having a length LA after the start code and the instruction data to the second-type amplifier has transmission data B having a length LB after the start code. The start code is a bit string indicative of the start of communication and the transmission data is determined in advance to be at a distance of a predetermined bit length immediately after the start code.

In the present invention, because the instruction data to first-type amplifier 51 and second-type amplifier 61 is sent via same serial buses 48A, 49A, it is necessary for the side of the amplifier for reception to be able to identify which amplifier is the destination of the instruction data. In the first embodiment, the order of instruction data and the length (bit length) of each instruction data to each amplifier to be arranged after the start code are determined in advance and when detecting the start code, each amplifier extracts the instruction (transmission) data at the corresponding portion destined to each amplifier.

As shown in FIG. 4B, positional instruction B calculated by main processor 42, that is, the instruction data corresponding to the second-type amplifier needs various kinds of data, such as the time constant of acceleration/deceleration, the current position, etc., in order to instruct the position or velocity, and therefore, the amount of data required for one time transmission is larger than the amount of data of PWM instruction A. On the other hand, PWM instruction A each has a small amount of data; however, because the instruction data is used immediately as an output for the motor, it is necessary to make the output period shorter than that of the positional instruction.

Figure 5A:
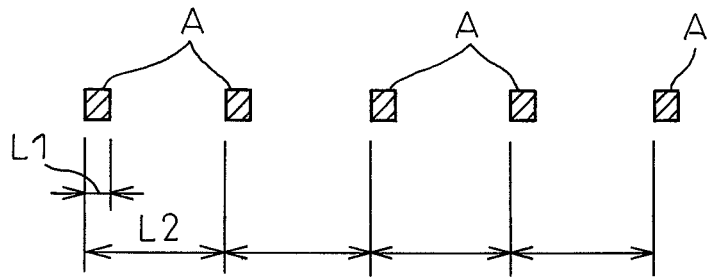
FIGS. 5A to 5D are diagrams explaining problems when the instruction data to amplifiers of different types is transmitted via a common serial bus and for explaining a transmission scheme of the present invention.
Figure 5B:
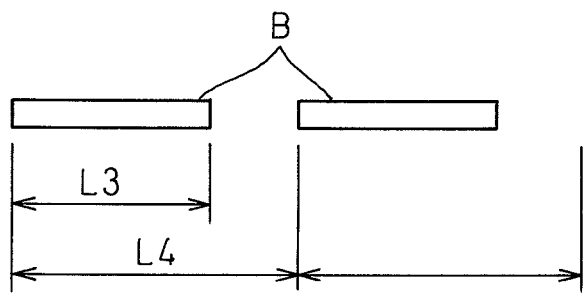

Because of this, as shown in FIG. 5A, it is necessary to transmit PWM instruction data A with a period equal to or less than L2 because the time required for transmission is L1. In contrast to this, as shown in FIG. 5B, positional instruction data B requires a time L3 for one time transmission, which is long; however, the period of transmission is comparatively long, and therefore, no problem will arise if transmission can be made with a period L4.

Figure 5C:
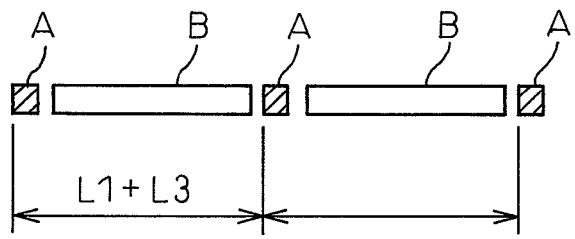

It can be considered to alternately transmit instruction data A and B as shown in FIG. 5C; however, in this case, a period of one transmission is at least L1+L3 and if this becomes equal to or greater than L2, there arises a problem that the control by the PWM instruction cannot be taken.

Figure 5D:
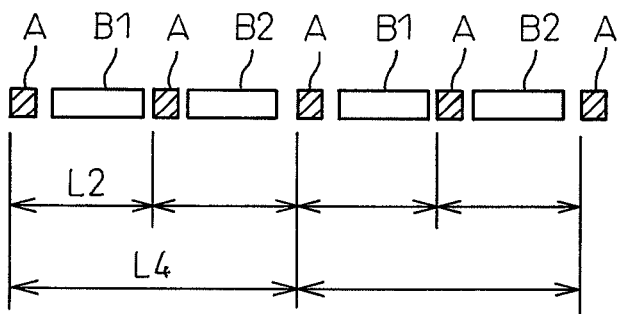

Because of this, in the first embodiment, as shown in FIG. 5D, positional instruction data B is divided into B1 and B2 and at first, A and the first half of B, that is, B1, are transmitted together and then, A and the second half of B, that is, B2, are transmitted together. The time required to transmit them is L1+L3/, respectively, and if this is shorter than period L2 required for the transmission of A (PWM signal), the control by the PWM instruction can be carried out normally. Because positional instruction data B obtains necessary data for one time transmission after the transmission of the first and second halves is completed, and therefore, it is sent with a period of 2×L2, and if this is shorter than L4, the normal control can be carried out.

Figure 6A:
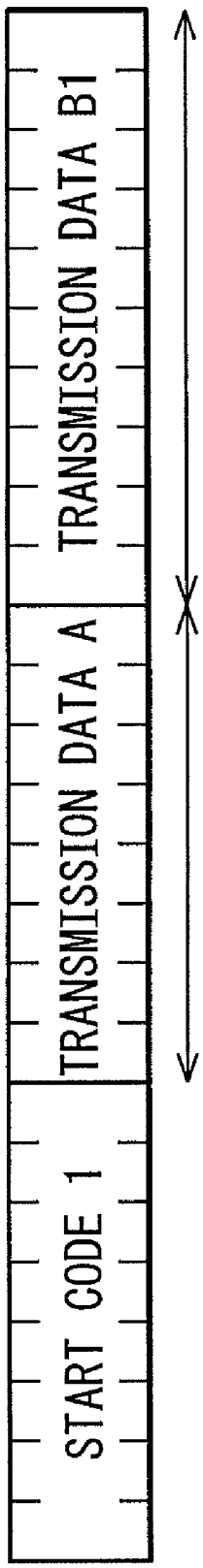
FIGS. 6A and 6B are diagrams showing a configuration of instruction data in the first embodiment.
Figure 6B:
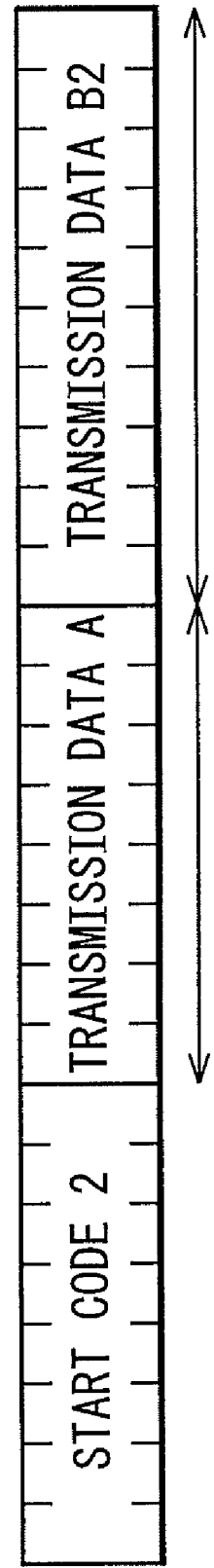

FIG. 6A and FIG. 6B are diagrams showing a configuration of instruction data to amplifier 51 and amplifier 61 in the motor control system in the first embodiment, in which positional instruction data B is transmitted after being divided into B1 and B2 as shown in FIG. 5D, wherein FIG. 6A showing a data configuration when A and B1 are transmitted and FIG. 6B, a data configuration when A and B2 are transmitted. Start code 1 in FIG. 6A indicates that B1 it transmitted and start code 2 in FIG. 6B indicates that B2 is transmitted. Amplifier 61 identifies whether B1 or B2 is the data to be transmitted by identifying the start code.

The instruction data to amplifier 51 and amplifier 61 is transmitted as described above, and therefore, serial bus control circuit 47 of numerical control device 41 outputs the PWM signal data read from transmission/reception buffer 44 for a PWM instruction type amplifier to serial bus 48A when transmitting the PWM signal data to amplifier 51, outputs the first half of the positional instruction data read from the first half of transmission/reception buffer 45 for a positional instruction type amplifier to serial bus 48A when transmitting the first half of the positional instruction data to amplifier 61, and outputs the second half of the positional instruction data read from the second half of transmission/reception buffer 45 for a positional instruction type amplifier to serial bus 48A when transmitting the second half of the positional instruction data to amplifier 61.

In the above explanation, an example is explained in which positional instruction data B is transmitted after being divided into B1 and B2; however, it is also possible to transmit the data after dividing it into three or more (n (n is an integer equal to or greater than 1) as needs arise and in such a case, there are n kinds of data format in FIG. 6A and FIG. 6B and start code n has a configuration in which transmission data A and transmission data B (n) follow.

The reply data to be transmitted via serial buses 48B and 49B also has a configuration in which the positional information (reply data) of amplifiers 51 and 61 follows after the start code. However, because the amount of data of the positional information to be transmitted at one time is small, it is not necessary to divide it into pieces for transmission.

FIG. 7 is a block diagram showing the configuration of first-type amplifier 51. First-type amplifier 51 has an instruction data input circuit 71, an instruction data output circuit 72, a reply data output circuit 73, a reply data input circuit 74, a serial/parallel conversion circuit 75, a start code detection circuit 76, a data latch circuit 77, a setting reservation circuit 78, a positional data buffer 79, a parallel/serial conversion circuit 80, and driver 52 shown in FIG. 3.

Instruction data input circuit 71 receives instruction data to be transmitted from numerical control device 41 via serial bus 48A and outputs received instruction data to instruction data output circuit 72 and serial/parallel conversion circuit 75. Instruction data output circuit 72 outputs the instruction data as is to serial bus 49A. Due to this, the instruction data output from serial bus control circuit 47 of numerical control device 41 is transmitted to amplifier 61 via amplifier 51.

Setting reservation circuit 78 reserves the number of bits indicative of the start and end positions of transmission data destined for amplifier 51 set by the setting means at the time of construction of the system. Serial/parallel conversion circuit 75 converts the instruction data, i.e., the received serial data, into parallel data. Start code detection circuit 76 inspects for the existence of the start code within the instruction data converted into parallel data and if detecting it, instructs data latch circuit 77 to latch the parallel data. Data latch circuit 77 counts the number of bits from the start code in the instruction data, latches data from the data start bit position to the data end position output from setting reservation circuit 78, and temporarily stores it. The stored data is sent to driver 52 immediately as a PWM instruction and a current output is generated.

Position data buffer 79 retains the positional information data detected by the pulse coder of motor 53 while updating it to the most recent data. The positional information data is converted into serial data in parallel/serial conversion circuit 80 and output as reply data to reply data output circuit 73.

Reply data input circuit 74 receives reply data (positional information) transmitted from amplifier 61 via serial bus 49B and outputs it to reply data output circuit 73. Reply data output circuit 73 adds the serial data from parallel/serial conversion circuit 80, i.e., the positional information data of motor 53, to the reply data of amplifier 61 sent from reply data input circuit 74 and outputs it to serial bus 48B. This processing is carried out by writing in a predetermined position that follows the start code in accordance with the format of the reply data.

FIG. 8 is a block diagram showing the configuration of second-type amplifier 61. Second-type amplifier 61 has an instruction data input circuit 81, an instruction data output circuit 82, a reply data output circuit 83, a reply data input circuit 84, a serial/parallel conversion circuit 85, a start code detection circuit 86, a data latch circuit 87, a setting reservation circuit 88, a selector 89, a reception buffer region 90, a positional data buffer 91, and a parallel/serial conversion circuit 92.

Instruction data input circuit 81, instruction data output circuit 82, reply data output circuit 83, reply data input circuit 84, serial/parallel conversion circuit 85, start code detection circuit 86, data latch circuit 87, setting reservation circuit 88, positional data buffer 91, and parallel/serial conversion circuit 92 have the same configuration as that of amplifier 51 explained in FIG. 7, however, differing in that instruction data input circuit 81 is connected to serial bus 49A, reply data output circuit 83 is connected to serial bus 49B, and no serial bus is connected to instruction data output circuit 82 or reply data input circuit 84. Because the positional information data of the amplifier in the previous stage is not input to reply data input circuit 84, reply data output circuit 83 adds the positional information data of motor 64 output from parallel/serial conversion circuit 92 to the start code and outputs it As described above, it is possible to connect three or more amplifiers and in such a case, the serial bus is connected to instruction data output circuit 82 and reply data input circuit 84, respectively, and the amplifier shown in FIG. 7 or FIG. 8 is connected thereto.

Start code detection circuit 86 outputs a signal indicative that the type of the start code corresponds to which one of 1 to n (here, 2). In response to this, selector 89 stores the data in a predetermined range that is latched by data latch circuit 87 in the n-th region in reception buffer region 90. Reception buffer region 90 is configured so that it can be accessed by DSP (third processor) 62 shown in FIG. 3. When data up to the n-th region of reception buffer region 90 is stored, DSP 62 calculates a PWM signal based on the positional instruction data stored in reception buffer region 90 and outputs it to driver 63. Driver 63 generates a current output based on the PWM signal and supplies it to motor 64.

Figure 9A:
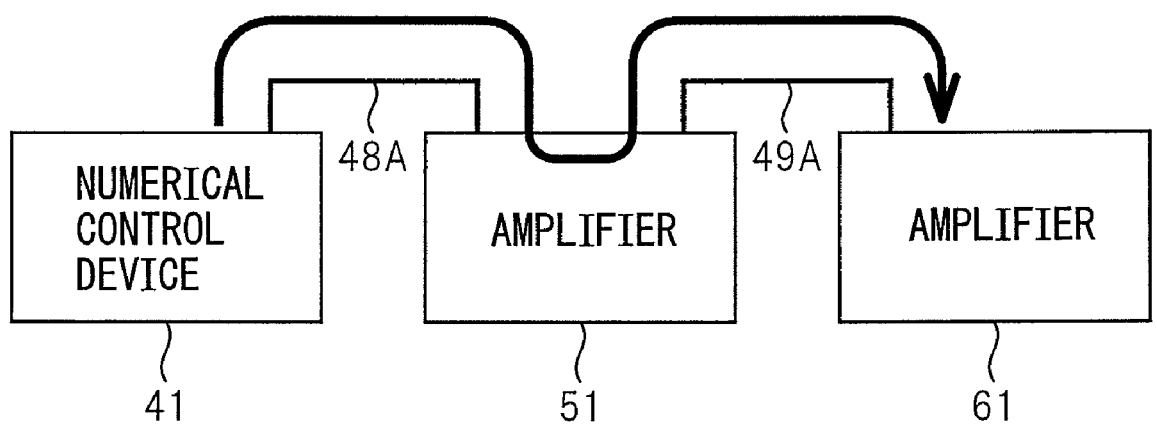
FIGS. 9A and 9B are diagrams explaining the transmission of instruction data and the transmission of reply data in the first embodiment.
Figure 9B:
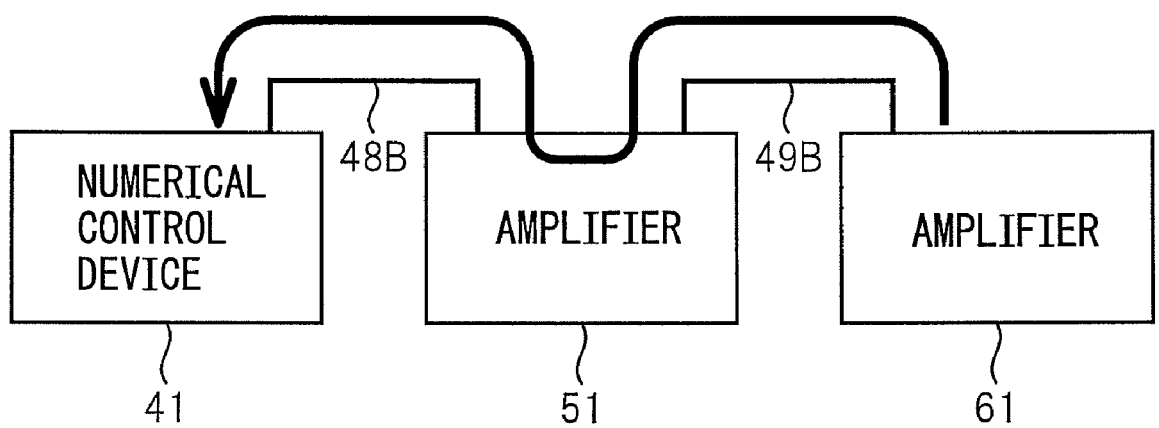

FIG. 9A is a diagram explaining the transmission of instruction data and FIG. 9B is a diagram for explaining the transmission of reply data. As shown in FIG. 9A, the instruction data is transmitted from numerical control device 41 to amplifier 51 via serial bus 48A and transmitted to amplifier 61 relayed by amplifier 51 and further via serial bus 49A.

As shown in FIG. 9B, the reply data is transmitted from amplifier 61 to amplifier 51 via serial bus 49B and transmitted to numerical control device 41 relayed by amplifier 51 and further via serial bus 48B. Numerical control device 41 finds the position and velocity of motors 53 and 64 based on the transmitted positional information data of amplifiers 51 and 61 and utilizes them for the calculation of the next position instruction and PWM instruction. In addition, first-type amplifier 51 measures various types of information, such as the current generated by the PWM instruction, using driver 52 and transmits the measured data to numerical control device 41 like the positional information.

FIG. 10 is a time chart showing the operations of numerical control device 41 and amplifiers 51 and 61 when the positional instruction is transmitted after being divided into three in the motor control system in the first embodiment. Numerical control device 41 transmits PWM instruction A and first part B1 of positional instruction B and then transmits PWM instruction A and second part B2 of positional instruction B, and further, transmits PWM instruction A and a third part B3 of positional instruction B, and these operations are repeated thereafter. First-type amplifier 51 extracts PWM instruction A from the received instruction data and further outputs the PWM instruction to driver 52. Driver 52 generates a current output based on the PWM instruction and supplies it to motor 53. Second-type amplifier 61 sequentially extracts B1, B2, and B3 constituting positional instruction B from the received instruction data and reproduces positional data B by combining B1, B2, and B3. DSP 62 calculates the PWM instruction from positional instruction B and further outputs the PWM instruction to driver 63. Driver 63 generates a current output based on the PWM instruction and supplies it to motor 64.

In the first embodiment, the motor control system is explained, in which one first-type amplifier 51 and one second-type amplifier 61 are controlled by one numerical control device 41. However, it is also possible to increase the number of amplifiers to be controlled. In a second embodiment, a motor control system is explained, in which two first-type amplifiers 51 and one second-type amplifier 61 are controlled by one numerical control device 41.

FIG. 11 is a block diagram showing a configuration of a motor control system in the second embodiment. As shown schematically, in the motor control system in the second embodiment, the first and third amplifiers are first-type amplifiers 51 and the second amplifier is second-type amplifier 61, and numerical control device 41 and the first unit, that is, amplifier 51, is connected by serial buses (two) 48, the first amplifier, i.e., amplifier 51, and the second amplifier, i.e., amplifier 61, are connected by serial bus 49, and the second amplifier, that is, amplifier 61, and the third amplifier, i.e., amplifier 51, are connected by serial bus 50. Numerical control device 41, the first and third amplifiers, i.e., first-type amplifiers 51, and the second amplifier, i.e., second-type amplifier 61, have the same configurations as those in the first embodiment. As a result, instruction data output circuit 82 and reply data input circuit 84 in the second amplifier, i.e., amplifier 61, are connected with instruction data input circuit 71 and reply data output circuit 73 in the third amplifier, i.e., amplifier 51, by a serial bus, respectively.

FIG. 12 is a diagram showing a configuration of instruction data in the second embodiment. As shown schematically, after the start code having a bit length of Z bits, PWM instruction data A having a bit length of X bits for the first amplifier, i.e., amplifier 51, is provided, and further, positional instruction data B having a bit length of Y bits for the second amplifier, that is, amplifier 61, is provided, and furthermore, PWM instruction data A having a bit length of X bits for the third amplifier, i.e., amplifier 51 is provided.

FIG. 13 is a diagram showing an example of the setting of control data in serial bus control circuit 47 of the numerical control device in the second embodiment. As shown schematically, four amplifiers can be connected and the data type of an amplifier to be connected, i.e., whether a PWM instruction is received or a positional instruction is received is set, and the start code, the start position (bits) of the data bits for the first to fourth units, and the end position (bits) of the data bits are set. In the second embodiment, three amplifiers are connected, and therefore, the data for the fourth unit is set to "none". As shown schematically, the start position of the start code is the first bit and the end position is the Z-th bit, the data type of the first amplifier is "A", the start position is the (Z+1)-th bit, and the end position is the (Z+X)-th bit, the data type of the second amplifier is "B", the start position is the (Z+X+1)-th bit, and the end position is the (Z+X+Y)-th bit, and the data type of the third amplifier is "A", the start position is the (Z+X+Y+1)-th bit, and the end position is the (Z+X+Y+X)-th bit. The start code detection circuit of each amplifier identifies the start code from the instruction data. In the case of the second-type amplifier, it is identified what number divided positional instruction data is included in the received data. The setting reservation circuit of each amplifier stores the start position and the end position in FIG. 13 and the data latch circuit counts from the start code to the start position in the instruction data and extracts data from the start position to the end position.

The embodiments of the present invention are described as above; however, it is obvious that there can be a variety of modification examples. For example, the number of amplifiers to be connected and the type thereof can be set arbitrarily. In addition, the configuration etc., of communication data can also be set arbitrarily. Further, the meanings of the terms used in claims are not limited to the meanings of the corresponding terms which are used in the specification.

The present invention is applied to the case where one numerical control device controls two or more amplifiers of different types and in particular, is applied to a motor control system in which a multi spindle control of a working machine is carried out.

We claim:

1. A motor control system, comprising:
   at least one first-type amplifier for driving a first motor;
   at least one second-type amplifier for driving a second motor;
   a numerical control device for controlling the at least one first-type amplifier and the at least one second-type amplifier; and
   a serial bus that sequentially connects the numerical control device, the at least one first-type amplifier, and the at least one second-type amplifier,
   wherein
   the numerical control device comprises:
      a first processor for calculating a positional instruction or a velocity instruction of all the motors to be controlled;
      a second processor for calculating a PWM instruction from the positional instruction or the velocity instruction calculated by the first processor for the first motor to be driven by the at least one first-type amplifier; and
      a serial bus control circuit for outputting to the serial bus
         (i) the PWM instruction calculated by the second processor, and
         (ii) the positional instruction or the velocity instruction calculated by the first processor for the second motor to be driven by the at least one second-type amplifier;
   the first-type amplifier is configured to generate a drive current signal of the first motor directly from the PWM instruction received from the numerical control device via the serial bus; and
   the second-type amplifier comprises a Digital Signal Processor (DSP) for calculating a PWM instruction of the second motor from the positional instruction or the velocity instruction received from the numerical control device via the serial bus, and the second-type amplifier is configured to generate a drive current signal of the second motor from the PWM instruction calculated by the DSP; and
   the first-type amplifier is free of any DSP.

2. The motor control system according to claim 1, wherein:
   the numerical control device further comprises
      a first transmission buffer for storing the PWM instruction calculated by the second processor, and
      a second transmission buffer for storing the positional instruction or the velocity instruction calculated by the first processor for the second-type amplifier; and
   the serial bus control circuit is configured to output an instruction stored in the first transmission buffer or the second transmission buffer to the serial bus according to whether the amplifier connected to the serial bus is the first-type or the second-type amplifier, respectively.

3. The motor control system according to claim 1, wherein each of the first-type and second-type amplifiers comprises:
   an input circuit for inputting transmission data from the serial bus, and
   an output circuit for outputting the transmission data inputted via the input circuit to the serial bus toward the next-stage amplifier.

4. A motor control system, comprising:
   at least one first-type amplifier for driving a first motor;
   at least one second-type amplifier for driving a second motor;
   a numerical control device for controlling the at least one first-type amplifier and the at least one second-type amplifier; and
   a serial bus that sequentially connects the numerical control device, the at least one first-type amplifier, and the at least one second-type amplifier,
   wherein
   the numerical control device comprises:
      a first processor for calculating a positional instruction or a velocity instruction of all the motors to be controlled;
      a second processor for calculating a PWM instruction from the positional instruction or the velocity instruction calculated by the first processor for the first motor to be driven by the at least one first-type amplifier; and
      a serial bus control circuit for outputting to the serial bus
         (i) the PWM instruction calculated by the second processor, and
         (ii) the positional instruction or the velocity instruction calculated by the first processor for the second motor to be driven by the at least one second-type amplifier;
   the first-type amplifier is configured to generate a drive current signal of the first motor directly from the PWM instruction received from the numerical control device via the serial bus;
   the second-type amplifier comprises a third processor for calculating a PWM instruction of the second motor from the positional instruction or the velocity instruction received from the numerical control device via the serial bus, and the second-type amplifier is configured to generate a drive current signal of the second motor from the PWM instruction calculated by the third processor;
   the numerical control device is configured to
      divide the positional instruction or the velocity instruction into divided parts and transmit the divided parts to the second-type amplifier, and
      transmit two or more PWM instructions in a undivided state to the first-type amplifier while transmitting the divided parts of the position instruction or the velocity instruction to the second-type amplifier; and
   the second-type amplifier comprises a buffer for accumulating the divided parts of the positional instructions or velocity instructions and the second-type amplifier is configured to unify the divided parts into one instruction.

5. A motor control system, comprising:
   at least one first-type amplifier for driving a first motor;
   at least one second-type amplifier for driving a second motor;
   a numerical control device for controlling the at least one first-type amplifier and the at least one second-type amplifier; and
   a first serial bus that sequentially connects the numerical control device, the at least one first-type amplifier, and the at least one second-type amplifier,
   wherein
   the numerical control device comprises:
      a first processor for calculating a positional instruction or a velocity instruction of all the motors to be controlled;
      a second processor for calculating a PWM instruction from the positional instruction or the velocity instruction calculated by the first processor for the first motor to be driven by the at least one first-type amplifier; and a serial bus control circuit for outputting to the first serial bus
(i) the PWM instruction calculated by the second processor, and
(ii) the positional instruction or the velocity instruction calculated by the first processor for the second motor to be driven by the at least one second-type amplifier;

the first-type amplifier is configured to generate a drive current signal of the first motor directly from the PWM instruction received from the numerical control device via the first serial bus;

the second-type amplifier comprises a third processor for calculating a PWM instruction of the second motor from the positional instruction or the velocity instruction received from the numerical control device via the first serial bus, and the second-type amplifier is configured to generate a drive current signal of the second motor from the PWM instruction calculated by the third processor;

the system further comprises a second serial bus that sequentially connects the at least one first-type amplifier, the at least one second-type amplifier, and the numerical control device;

each of the first-type and second-type amplifiers comprises an input circuit for inputting transmission data from the second serial bus and an output circuit for outputting the transmission data inputted via the input circuit to the second serial bus toward the next-stage amplifier or the numerical control device; and each of the first-type and second-type amplifiers is configured to
add positional information data of the motor controlled by the amplifier to positional information data included in the transmission data received via the input circuit from the previous-stage amplifier on the second serial bus, and
output resulting positional information data to the second serial bus through the output circuit.

* * * * *